(12) United States Patent
Saitoh et al.

(10) Patent No.: US 12,044,913 B2
(45) Date of Patent: Jul. 23, 2024

(54) OPTICAL LAMINATE, LIGHT GUIDE ELEMENT, AND AR DISPLAY DEVICE

(71) Applicant: FUJIFILM Corporation, Tokyo (JP)

(72) Inventors: Yukito Saitoh, Minami-ashigara (JP); Hiroshi Sato, Minami-ashigara (JP); Katsumi Sasata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 680 days.

(21) Appl. No.: 17/226,168

(22) Filed: Apr. 9, 2021

(65) Prior Publication Data
US 2021/0223581 A1 Jul. 22, 2021

Related U.S. Application Data

(63) Continuation of application No. PCT/JP2019/039763, filed on Oct. 9, 2019.

(30) Foreign Application Priority Data

Oct. 12, 2018 (JP) .................. 2018-193248

(51) Int. Cl.
G02F 1/11 (2006.01)
G02F 1/1335 (2006.01)
G02F 1/137 (2006.01)

(52) U.S. Cl.
CPC ........ G02F 1/116 (2013.01); G02F 1/133541 (2021.01); G02F 1/133543 (2021.01); G02F 1/13718 (2013.01); G02F 2201/343 (2013.01)

(58) Field of Classification Search
CPC ............... G02F 2201/343; G02F 1/116; G02F 1/133541; G02F 1/133543; G02F 1/13718
See application file for complete search history.

(56) References Cited

U.S. PATENT DOCUMENTS 6,549,254 B1 4/2003 Grupp et al.
2003/0058387 A1 3/2003 Fuenfschilling et al.
(Continued)

FOREIGN PATENT DOCUMENTS

JP 2000-56115 A 2/2000
JP 2001-91944 A 4/2001
(Continued)

OTHER PUBLICATIONS

Japanese Office Action for corresponding Japanese Application No. 2020-551185, dated Apr. 26, 2022, with English translation.
(Continued)

*Primary Examiner* — Cara E Rakowski
(74) *Attorney, Agent, or Firm* — Birch, Stewart, Kolasch & Birch, LLP

(57) ABSTRACT

Provided are an optical laminate in which a large diffraction angle can be obtained, a light guide element, and an AR display device. The optical laminate includes, in the following order: a first optically-anisotropic layer that is formed of a composition including a liquid crystal compound and has a liquid crystal alignment pattern in which a direction of an optical axis derived from the liquid crystal compound changes while continuously rotating in at least one in-plane direction; a cholesteric liquid crystal layer that is obtained by immobilizing a cholesteric liquid crystalline phase; and a second optically-anisotropic layer that is formed of a composition including a liquid crystal compound and has a liquid crystal alignment pattern in which a direction of an optical axis derived from the liquid crystal compound continuously rotates in at least one in-plane direction, in which in the first optically-anisotropic layer and the second optically-anisotropic layer, the one in-plane directions in which the direction of the optical axis derived from the liquid crystal compound continuously rotates are the same, and (Continued)

rotation directions of the direction of the optical axis derived from the liquid crystal compound in the one in-plane direction are the same.

14 Claims, 6 Drawing Sheets

(56) References Cited

U.S. PATENT DOCUMENTS

| | | |
|---|---|---|
| 2013/0077040 A1 | 3/2013 | Escuti et al. |
| 2016/0033698 A1 | 2/2016 | Escuti et al. |
| 2017/0343807 A1 | 11/2017 | Anzai et al. |
| 2018/0143438 A1* | 5/2018 | Oh .................. G02B 6/0056 |
| 2019/0235243 A1 | 8/2019 | Anzai et al. |
| 2020/0271842 A1* | 8/2020 | Yoshida ............ G02F 1/133553 |
| 2021/0231985 A1* | 7/2021 | Sato .................. G02F 1/133541 |

FOREIGN PATENT DOCUMENTS

| | | |
|---|---|---|
| JP | 2010-525394 A | 7/2010 |
| JP | 2012-203123 A | 10/2012 |
| JP | 2017-522601 A | 8/2017 |
| WO | WO 98/20391 A1 | 5/1998 |
| WO | WO 2016/133186 A1 | 8/2016 |
| WO | WO 2018/084076 A1 | 5/2018 |
| WO | WO 2018/094096 A1 | 5/2018 |
| WO | WO-2018097007 A1 * | 5/2018 ........... G02B 5/1833 |

OTHER PUBLICATIONS

International Preliminary Report on Patentability and Written Opinion of the International Searching Authority (Forms PCT/IB/326, PCT/IB/373 and PCT/ISA/237) for corresponding International Application No. PCT/JP2019/039763, dated Apr. 22, 2021, with English translation.

International Search Report (Form PCT/ISA/210) for corresponding International Application No. PCT/JP2019/039763, dated Nov. 19, 2019, with English translation.

Kress et al., "Towards the Ultimate Mixed Reality Experience: HoloLens Display Architecture Choices," SID 2017 Digest, 2017, pp. 127-131.

* cited by examiner

OPTICAL LAMINATE, LIGHT GUIDE ELEMENT, AND AR DISPLAY DEVICE

CROSS-REFERENCE TO RELATED APPLICATIONS

This application is a Continuation of PCT International Application No. PCT/JP2019/039763 filed on Oct. 9, 2019, which claims priority under 35 U.S.C. § 119(a) to Japanese Patent Application No. 2018-193248 filed on Oct. 12, 2018. The above application is hereby expressly incorporated by reference, in its entirety, into the present application.

BACKGROUND OF THE INVENTION

1. Field of the Invention

The present invention relates to an optical laminate that reflects light, and a light guide element and an AR display device including the optical laminate.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end portion of a light guide plate. As a result, the light is introduced into the light guide plate at an angle such that the light propagates in the light guide plate. The light propagated in the light guide plate is also diffracted by the diffraction element in the other end portion of the light guide plate and is emitted from the light guide plate to an observation position by the user.

As this diffraction grating, a diffraction element formed of liquid crystal is known.

For example, JP2017-522601A describes an optical element comprising a plurality of stacked birefringent sublayers configured to alter a direction of propagation of light passing therethrough according to a Bragg condition, in which the stacked birefringent sublayers respectively comprise local optical axes that vary along respective interfaces between adjacent ones of the stacked birefringent sublayers to define respective grating periods. The optical element described in JP2017-522601A diffracts transmitted light. JP2017-522601A describes that light incident into a substrate (light guide plate) is diffracted by an optical element such that the light is incident at angle at which the light is totally reflected in the substrate and is guided in a direction substantially perpendicular to the incidence direction of the light in the substrate (refer to FIG. 9 of JP2017-522601A).

SUMMARY OF THE INVENTION

In the optical element described in JP2017-522601A, it is difficult to increase a diffraction angle of light. Therefore, in a case where light is caused to be incident from a direction perpendicular to a light guide direction in a light guide plate using the optical element, it is difficult to cause light to be incident at an angle where the light is totally reflected in the light guide plate, and a part of the light leaks from the inside of the light guide plate. Therefore, there is a problem in that the light guide efficiency decreases.

In the optical element, the angle of diffraction of light depends on a grating period defined by local optical axes of a stacked birefringent sublayer. Therefore, by decreasing the grating period, a large diffraction angle can be obtained. However, as the grating period decreases, manufacturing becomes difficult. Therefore, it is difficult to obtain a sufficiently large diffraction angle.

An object of the present invention is to solve the problems of the related art and to provide an optical laminate in which a large diffraction angle can be obtained, a light guide element, and an AR display device.

In order to achieve the object, the present invention has the following configurations.

[1] An optical laminate comprising, in the following order:
  a first optically-anisotropic layer that is formed of a composition including a liquid crystal compound and has a liquid crystal alignment pattern in which a direction of an optical axis derived from the liquid crystal compound continuously rotates in at least one in-plane direction;
  a cholesteric liquid crystal layer that is obtained by immobilizing a cholesteric liquid crystalline phase; and
  a second optically-anisotropic layer that is formed of a composition including a liquid crystal compound and has a liquid crystal alignment pattern in which a direction of an optical axis derived from the liquid crystal compound continuously rotates in at least one in-plane direction,
  in which in the first optically-anisotropic layer and the second optically-anisotropic layer, the one in-plane directions in which the direction of the optical axis derived from the liquid crystal compound continuously rotates are the same, and rotation directions of the direction of the optical axis derived from the liquid crystal compound in the one in-plane direction are the same.

[2] The optical laminate according to [1],
  in which in a case where, in the first optically-anisotropic layer and the second optically-anisotropic layer, a length over which the direction of the optical axis derived from the liquid crystal compound rotates by 180° in the one in-plane direction in which the direction of the optical axis derived from the liquid crystal compound changes while continuously rotating is set as a single period, a length of the single period is 0.1 μm to 50 μm.

[3] The optical laminate according to [1] or [2],
  in which an in-plane phase difference of the first optically-anisotropic layer and the second optically-anisotropic layer is 190 to 390.

[4] The optical laminate according to any one of [1] to [3], comprising:
  two or more cholesteric liquid crystal layers having different selective reflection wavelengths.

[5] The optical laminate according to [4],
in which in the two or more cholesteric liquid crystal layers, directions of circularly polarized light to be reflected are the same.
[6] A light guide element comprising:
the optical laminate according to any one of [1] to [5]; and
a light guide plate.
[7] The light guide element according to [6],
in which the optical laminate is disposed at at least either an incidence position or an emission position of light in the light guide plate.
[8] The light guide element according to [6] or [7],
in which in the first optically-anisotropic layer and the second optically-anisotropic layer, the one in-plane direction in which the direction of the optical axis derived from the liquid crystal compound continuously rotates is parallel to a light guide direction of light in the light guide plate.
[9] An AR display device comprising:
the light guide element according to any one of [6] to [8]; and
an image display device.

According to the present invention, an optical laminate in which a large diffraction angle can be obtained, a light guide element, and an AR display device can be provided.

DESCRIPTION OF THE PREFERRED EMBODIMENTS

Figure 1:
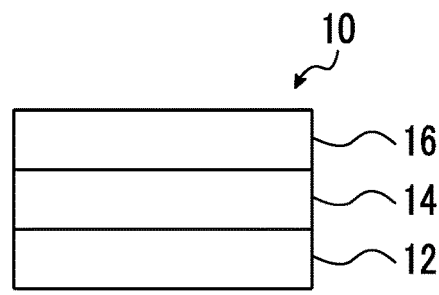
FIG. 1 is a cross-sectional view schematically showing an example of an optical laminate according to the present invention.

Hereinafter, an optical laminate, a light guide element, and an AR display device according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, a selective reflection center wavelength refers to an average value of two wavelengths at which, in a case where a minimum value of a transmittance of a target object (member) is represented by Tmin (%), a half value transmittance: T½ (%) represented by the following expression is exhibited.

Expression for obtaining Half Value Transmittance:

$$T\tfrac{1}{2}=100-(100-T\mathrm{min})\div 2$$

In addition, selective reflection center wavelengths of a plurality of layers being "equal" does not represent that the selective reflection center wavelengths are exactly equal, and error is allowed in a range where there are no optical effects. Specifically, selective reflection center wavelengths of a plurality of objects being "equal" represents a difference between the selective reflection center wavelengths of the respective objects is 20 nm or less, and this difference is preferably 15 nm or less and more preferably 10 nm or less.

[Optical Laminate]

The optical laminate according to the embodiment of the present invention comprises: a first optically-anisotropic layer that is formed of a composition including a liquid crystal compound and has a liquid crystal alignment pattern in which a direction of an optical axis derived from the liquid crystal compound changes while continuously rotating in at least one in-plane direction;
a cholesteric liquid crystal layer that is obtained by immobilizing a cholesteric liquid crystalline phase; and
a second optically-anisotropic layer that is formed of a composition including a liquid crystal compound and has a liquid crystal alignment pattern in which a direction of an optical axis derived from the liquid crystal compound continuously rotates in at least one in-plane direction,
in which in the first optically-anisotropic layer and the second optically-anisotropic layer, the one in-plane directions in which the direction of the optical axis derived from the liquid crystal compound continuously rotates are the same, and rotation directions of the direction of the optical axis derived from the liquid crystal compound in the one in-plane direction are the same.

FIG. 1 is a diagram conceptually showing an example of the optical laminate according to the embodiment of the present invention.

An optical laminate 10 shown in FIG. 1 has a configuration in which a first optically-anisotropic layer 12, a cholesteric liquid crystal layer 14, and a second optically-anisotropic layer 16 are laminated in this order.

The first optically-anisotropic layer 12 is a layer that is formed of a composition including a liquid crystal compound, and has a liquid crystal alignment pattern in which a direction of an optical axis derived from the liquid crystal compound continuously rotates in at least one in-plane direction.

The first optically-anisotropic layer 12 refracts (diffracts) incident circularly polarized light to allow transmission of the light in a direction in which the direction of the optical axis continuously rotates. In this case, the diffraction direction varies depending on the turning direction of circularly polarized light.

In addition, the first optically-anisotropic layer 12 changes a turning direction of transmitted circularly polarized light into an opposite direction.

The configuration of the first optically-anisotropic layer 12 will be described below in detail.

The cholesteric liquid crystal layer 14 is a layer obtained by immobilizing a cholesteric liquid crystalline phase, and has a cholesteric liquid crystal structure in which the liquid crystal compound is helically aligned along a helical axis parallel to a thickness direction.

The cholesteric liquid crystal layer 14 reflects circularly polarized light having a selective reflection wavelength in one turning direction, and allows transmission of circularly polarized light in another turning direction and light having a wavelength other than the selective reflection wavelength.

The configuration of the cholesteric liquid crystal layer 14 will be described below in detail.

The second optically-anisotropic layer 16 is a layer that is formed of a composition including a liquid crystal compound, and has a liquid crystal alignment pattern in which a direction of an optical axis derived from the liquid crystal compound continuously rotates in at least one in-plane direction.

The second optically-anisotropic layer 16 refracts incident circularly polarized light to allow transmission of the light in a direction in which the direction of the optical axis continuously rotates. In this case, the diffraction direction varies depending on the turning direction of circularly polarized light.

In addition, the second optically-anisotropic layer 16 changes a turning direction of transmitted circularly polarized light into an opposite direction.

The configuration of the second optically-anisotropic layer 16 will be described below in detail.

Here, in the optical laminate 10 according to the embodiment of the present invention, in the first optically-anisotropic layer 12 and the second optically-anisotropic layer 16, the one in-plane directions in which the direction of the optical axis derived from the liquid crystal compound continuously rotates are the same, and rotation directions of the direction of the optical axis derived from the liquid crystal compound in the one in-plane direction are the same. That is, the first optically-anisotropic layer 12 and the second optically-anisotropic layer 16 exhibit the same act on incident light.

It is preferable that the first optically-anisotropic layer 12 and the second optically-anisotropic layer 16 have the same configuration.

The optical laminate 10 having the above-described configuration diffracts incident light to be reflected. This point will be described below.

[Light Guide Element and AR Display Device]

The light guide element according to the embodiment of the present invention includes the above-described optical laminate and a light guide plate.

The Augmented Reality (AR) display device according to the embodiment of the present invention includes the light guide element and an image display device.

Figure 2:
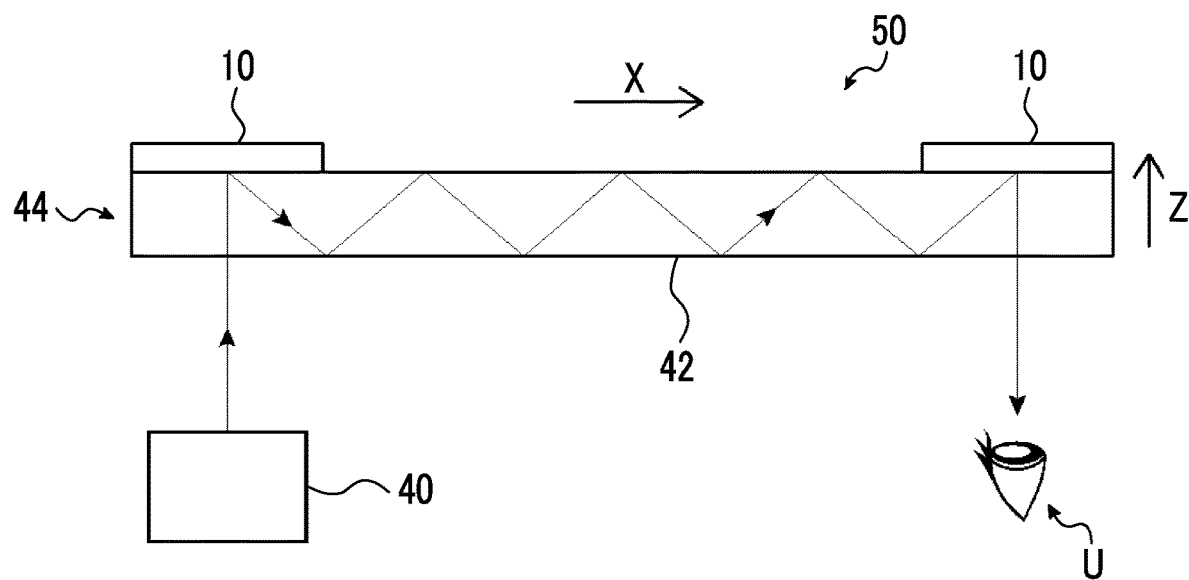
FIG. 2 is a diagram schematically showing an example of an AR display device including the optical laminate according to the present invention.

FIG. 2 conceptually shows an example of the AR display device according to the embodiment of the present invention.

The AR display device shown in FIG. 2 includes a display (image display device) 40 and a light guide element 44.

The light guide element 44 is the light guide element according to the embodiment of the present invention and includes two optical laminates 10 and a light guide plate 42.

The light guide plate 42 guides light in a rectangular shape that is elongated in one direction.

As shown in FIG. 2, the optical laminate 10 is disposed on each of a surface of the light guide plate 42 on one end portion side in a longitudinal direction and a surface of the light guide plate 42 on another end portion side in the longitudinal direction. The disposition positions of the two optical laminates 10 correspond to an incidence position and an emission position of light of the light guide plate 42, respectively. In addition, the two optical laminates 10 are disposed on the same surface of the light guide plate 42.

The light guide plate 42 is not particularly limited, and a well-known light guide plate of the related art that is used in an image display device or the like can be used.

As shown in FIG. 2, the display 40 is disposed on a surface of one end portion of the light guide plate 42 opposite to the surface where the optical laminate 10 is disposed. In addition, a surface of the one end portion of the light guide plate 42 opposite to the surface where the optical laminate 10 is disposed is an observation position of a user U.

In the following description, the longitudinal direction of the light guide plate 42 will be referred to as "X direction", and a direction that is perpendicular to the X direction and perpendicular to the surface of the optical laminate 10 will be referred to as "Z direction". The Z direction may be a laminating direction of the respective layers of the optical laminate 10 (refer to FIG. 3).

In the AR display device 50 having the above-described configuration, as indicated by arrows, light displayed by the display 40 is incident into the light guide plate 42 from the surface of the one end portion of the light guide plate 42 opposite to the surface where the optical laminate 10 is disposed. The light incident into the light guide plate 42 is reflected from the optical laminate 10. In this case, the light is reflected in a direction having an angle different from that of a specular reflection direction due to the diffraction effect of the optical laminate 10 without being specularly reflected (regularly reflected). In the example shown in FIG. 2, light is incident from a direction (Z direction) substantially perpendicular to the optical laminate 10, and is reflected in a direction that is tilted with a large angle from the perpendicular direction toward the longitudinal direction (X direction) of the light guide plate 42.

Since the light reflected from the optical laminate 10 is reflected with a large angle with respect to the angle of the incidence light, an angle of a light traveling direction with respect to the surface of the light guide plate is small. Therefore, the light is totally reflected from the both surfaces of the light guide plate 42 and is guided in the longitudinal direction (X direction) in the light guide plate 42.

The light guided in the light guide plate 42 is reflected from the optical laminate 10 in another end portion of the light guide plate 42 in the longitudinal direction. In this case, the light is reflected in a direction having an angle different from that of a specular reflection direction due to the diffraction effect of the optical laminate 10 without being specularly reflected. In the example shown in FIG. 2, the light is incident from an oblique direction with respect to the optical laminate 10 and is reflected in a direction perpendicular to the surface of the optical laminate 10.

The light reflected from the optical laminate 10 reaches the surface of the light guide plate 42 opposite to the surface where the optical laminate 10 is disposed, but is incident to be substantially perpendicular to the surface. Therefore, the light is emitted to the outside of the light guide plate 42 without being totally reflected. That is, the light is emitted to the observation position of the user U.

This way, in an AR display device 50, an image displayed by the display 40 is incident into one end of the light guide element 44, propagates in the light guide element 44, and is emitted from another end of the light guide element 44 such that the virtual image is displayed to be superimposed on a scene that is actually being seen by the user U.

Here, the optical laminate 10 according to the embodiment of the present invention can reflect light at a large diffraction angle. This point will be described using FIG. 3.

Figure 3:
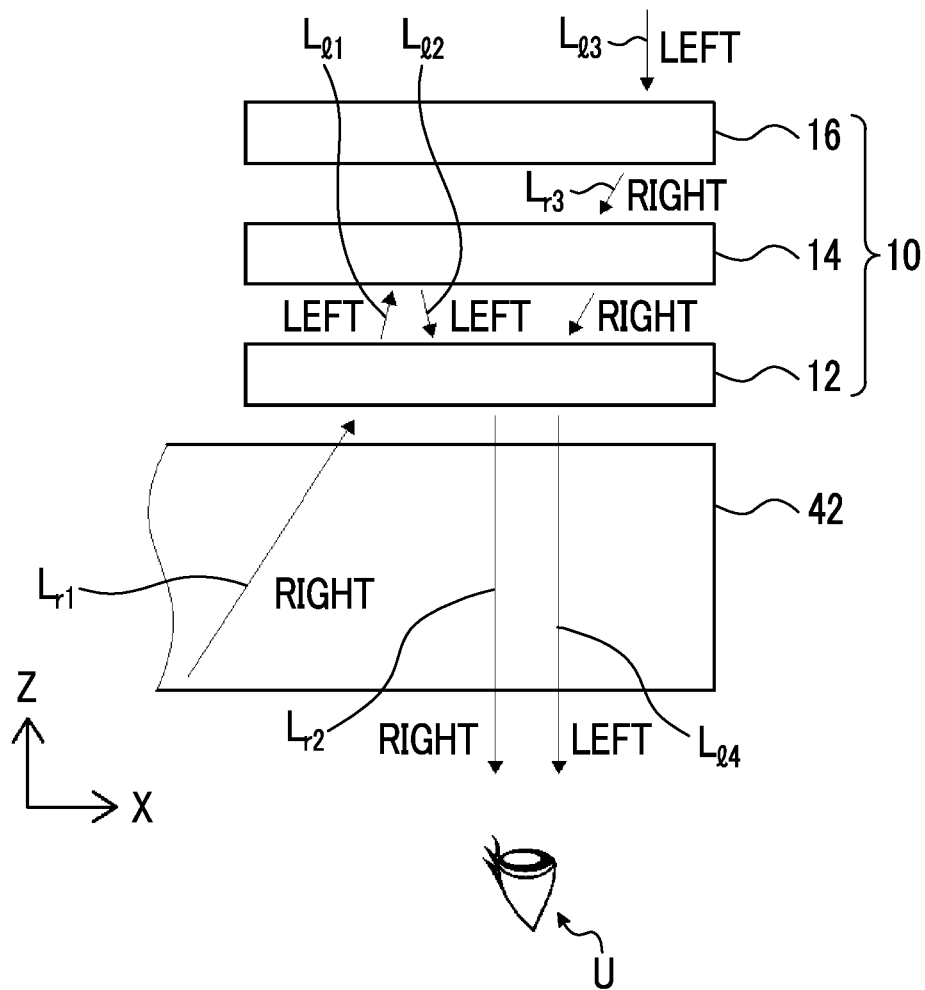
FIG. 3 is a schematic diagram showing an action of the optical laminate.

FIG. 3 is an enlarged view showing an emission side end portion of the AR display device 50 of FIG. 2. In addition, in FIG. 3, for convenience of description, the light guide plate 42 and the respective layers (the first optically-anisotropic layer 12, the cholesteric liquid crystal layer 14, and the second optically-anisotropic layer 16) of the optical laminate 10 are disposed to be spaced from each other.

For example, a case where the light guided in the light guide plate 42 is right circularly polarized light will be described. In a case where right circularly polarized light $L_{r1}$ guided in the light guide plate 42 and incident into the first optically-anisotropic layer 12 of the optical laminate 10 from an oblique direction transmits through the first optically-anisotropic layer 12, the light is diffracted in a direction in which an angle with respect to an axis (Z-axis) perpendicular to the surface of the optical laminate 10 decreases in the X direction. That is, the right circularly polarized light $L_{r1}$ transmitted through the first optically-anisotropic layer 12 is refracted to the left side in the traveling direction as shown in FIG. 3. In addition, the right circularly polarized light $L_{r1}$ transmitted through the first optically-anisotropic layer 12 is converted into left circularly polarized light $L_{l1}$.

The left circularly polarized light $L_{l1}$ transmitted through the first optically-anisotropic layer 12 is regularly reflected from the cholesteric liquid crystal layer 14. That is, in the example shown in FIG. 3, the cholesteric liquid crystal layer 14 reflects left circularly polarized light and allows transmission of right circularly polarized light.

Left circularly polarized light $L_{l2}$ reflected from the cholesteric liquid crystal layer 14 is incident into the first optically-anisotropic layer 12. In a case where the left circularly polarized light $L_{l2}$ incident into the first optically-anisotropic layer 12 transmits through the first optically-anisotropic layer 12, the light is refracted to the right side in the traveling direction as shown in FIG. 3. That is, in a case where the left circularly polarized light $L_{l2}$ transmits through the first optically-anisotropic layer 12, the light is refracted in a direction opposite to the direction in which the right circularly polarized light is refracted in the traveling direction. As a result, the light is diffracted in a direction in which an angle with respect to an axis (Z-axis) perpendicular to the surface of the optical laminate 10 decreases. In addition, the left circularly polarized light $L_{l2}$ transmitted through the first optically-anisotropic layer 12 is converted into right circularly polarized light $L_{r2}$.

The right circularly polarized light $L_{r2}$ transmitted through the first optically-anisotropic layer 12 passes through the inside of the light guide plate 42 and reaches the surface of the light guide plate 42 where the optical laminate 10 is disposed. In this case, an angle of the light traveling direction with respect to the surface of the light guide plate is large. Therefore, the light is emitted to the outside of the light guide plate 42 without being totally reflected from the surface of the light guide plate 42. As a result, the light is emitted to the observation position of the user U.

This way, in the optical laminate 10 according to the embodiment of the present invention, the light incident into the optical laminate 10 transmits through the first optically-anisotropic layer 12 twice and is diffracted per transmission. Therefore, a diffraction angle that is twice the diffraction angle of the single first optically-anisotropic layer 12 can be obtained.

In the description, the action of the optical laminate 10 has been described using the optical laminate 10 disposed on the emission side of the light guide plate 42. However, the same effect can also be obtained in the optical laminate 10 disposed on the incidence side of the light guide plate 42. That is, the optical laminate 10 disposed on the incidence side of the light guide plate 42 can reflect light emitted from the display 40 at the diffraction angle that is twice the diffraction angle of the single first optically-anisotropic layer 12.

In the optical laminate according to the embodiment of the present invention, in a case where light is reflected, light is diffracted at the diffraction angle that is twice the diffraction angle of the single optically-anisotropic layer. Therefore, even in a case where light is incident from a direction substantially perpendicular to the light guide direction in the light guide plate, light can be diffracted at an angle where light is totally reflected in the light guide plate. In a case where light is guided in the light guide plate, the leak of a part of the light from the inside of the light guide plate can be suppressed, and the light guide efficiency can be improved.

In addition, by arranging the optical laminate at a position where light is emitted from the light guide plate, in a case where light guided in the light guide plate is incident into the optical laminate at an angle where the light is totally reflected, that is, in a case where the light is incident into the surface of the optical laminate at a small angle, the light can be diffracted in a direction substantially perpendicular to the surface of the optical laminate, and the light can be emitted to the outside of the light guide plate.

In addition, in the optical laminate according to the embodiment of the present invention, by laminating the first optically-anisotropic layer and the cholesteric liquid crystal layer, a diffraction angle that is twice the diffraction angle of the first optically-anisotropic layer can be obtained. Therefore, in order to obtain a large diffraction angle, it is not necessary to decrease the period of the liquid crystal alignment pattern, and manufacturing can be easily performed.

Here, according to the investigation by the present inventors, it was found that, with only the configuration where the first optically-anisotropic layer and the cholesteric liquid crystal layer are laminated, there is a problem in that external light is refracted from the first optically-anisotropic layer such that the user U observes the scene at a deviated angle.

On the other hand, the optical laminate according to the embodiment of the present invention further includes the second optically-anisotropic layer on the cholesteric liquid crystal layer. As a result, the problem that the scene is observed at a deviated angle can be prevented.

This point will be described using FIG. 3. In FIG. 3, in a case where the second optically-anisotropic layer 16 is not present, right circularly polarized light $L_{r3}$ incident into the cholesteric liquid crystal layer 14 from an oblique direction, transmits through the cholesteric liquid crystal layer 14, and is incident into the first optically-anisotropic layer 12. The right circularly polarized light $L_{r3}$ incident into the first optically-anisotropic layer 12 is diffracted to the left side in the traveling direction. In addition, the right circularly polarized light $L_{r3}$ transmitted through the first optically-anisotropic layer 12 is converted into left circularly polarized light $L_{l4}$. The left circularly polarized light $L_{l4}$ transmitted through the first optically-anisotropic layer 12 passes through the inside of the light guide plate 42 and is emitted to the outside of the light guide plate 42 from the surface of the light guide plate 42 opposite to the surface where the optical laminate 10 is disposed. As a result, the light is emitted at the observation position of the user U.

In other words, the user U observes the scene in a direction indicated by the arrow of the right circularly polarized light $L_{r3}$ in FIG. 3 as the scene in the front direction (Z direction).

This way, with only the configuration where the first optically-anisotropic layer and the cholesteric liquid crystal layer are laminated, there is a problem in that external light is refracted from the first optically-anisotropic layer such that the user U observes the scene at a deviated angle.

On the other hand, the optical laminate 14 according to the embodiment of the present invention further includes the second optically-anisotropic layer 16 on the cholesteric liquid crystal layer. In this case, as shown in FIG. 3, in a case where the left circularly polarized light $L_{l3}$ incident into the second optically-anisotropic layer 16 from the front direction (Z direction) of the user U transmits through the second optically-anisotropic layer 16, the light is diffracted to the right side in the traveling direction. In addition, the left circularly polarized light $L_{l3}$ transmitted through the second optically-anisotropic layer 16 is converted into right circularly polarized light $L_{r3}$. The right circularly polarized light $L_{r3}$ transmitted through the second optically-anisotropic layer 16 transmits through the cholesteric liquid crystal layer 14 and is incident into the first optically-anisotropic layer 12.

The right circularly polarized light $L_{r3}$ incident into the first optically-anisotropic layer 12 is diffracted to the left side in the traveling direction. In addition, the right circularly polarized light $L_{r3}$ transmitted through the first optically-anisotropic layer 12 is converted into left circularly polarized light $L_{l4}$. The left circularly polarized light $L_{l4}$ transmitted through the first optically-anisotropic layer 12 passes through the inside of the light guide plate 42 and is emitted to the outside of the light guide plate 42 from the surface of the light guide plate 42 opposite to the surface where the optical laminate 10 is disposed. As a result, the light is emitted at the observation position of the user U.

Here, in the first optically-anisotropic layer 12 and the second optically-anisotropic layer 16, the one in-plane directions in which the direction of the optical axis derived from the liquid crystal compound continuously rotates are the same, and rotation directions of the direction of the optical axis derived from the liquid crystal compound in the one in-plane direction are the same. That is, the first optically-anisotropic layer 12 and the second optically-anisotropic layer 16 exhibit the same act on incident light. Accordingly, the diffraction angle of the first optically-anisotropic layer 12 is substantially the same as the diffraction angle of the second optically-anisotropic layer 16. In addition, turning directions of circularly polarized light incident into the first optically-anisotropic layer 12 and circularly polarized light incident into the second optically-anisotropic layer 16 are opposite to each other. Therefore, external light (left circularly polarized light $L_{l3}$) incident into the optical laminate 10 is refracted at the same diffraction angle as that in the opposite direction in the optical laminate 10. Therefore, light (left circularly polarized light $L_{l4}$) emitted from the optical laminate 10 is substantially parallel to external light incident into the optical laminate 10.

In other words, the user U observes the scene in a direction indicated by the arrow of the left circularly polarized light $L_{l3}$ in FIG. 3 as the scene in the front direction (Z direction).

This way, the optical laminate according to the embodiment of the present invention has the configuration in which the first optically-anisotropic layer, the cholesteric liquid crystal layer, and the second optically-anisotropic layer are laminated. As a result, external light can be prevented from being refracted and observed by the user U, and the problem that the scene is observed at a deviated angle can be prevented.

Here, in the example shown in FIG. 3, the first optically-anisotropic layer 12 (and the second optically-anisotropic layer 16) diffracts right circularly polarized light to the right side in the traveling direction and diffracts left circularly polarized light to the left side in the traveling direction, but the embodiment is not limited thereto. The first optically-anisotropic layer 12 (the second optically-anisotropic layer 16) may be configured to diffract right circularly polarized light to the left side in the traveling direction and to diffract left circularly polarized light to the right side in the traveling direction.

In addition, in the example shown in FIG. 3, the cholesteric liquid crystal layer 14 is configured to reflect left circularly polarized light and to allow transmission of right circularly polarized light, but the embodiment is not limited thereto. The cholesteric liquid crystal layer 14 may be configured to reflect right circularly polarized light and to allow transmission of left circularly polarized light.

The diffraction directions of light of the first optically-anisotropic layer 12 and the second optically-anisotropic layer 16 and the turning direction of circularly polarized light to be reflected from the cholesteric liquid crystal layer 14 may be appropriately set according to the configuration of the AR display device 50 (light guide element 44) in which the optical laminate 10 is used. Specifically, the directions may be set according to the turning direction of light emitted from the display 40, the direction in which light is incident into the optical laminate 10, the direction in which light is emitted from the optical laminate 10, and the like.

In addition, in the example shown in FIG. 1, the optical laminate includes one cholesteric liquid crystal layer, but the present invention is not limited thereto. The optical laminate may be configured to include two or more cholesteric liquid crystal layers having different selective reflection wavelengths.

For example, in the AR display device, in a case where a display displays colors using light of three RGB colors, the AR display device may include three cholesteric liquid crystal layers having wavelengths of the three RGB light components emitted from the display as selective reflection wavelengths. With this configuration, in a case where each of the three RGB light components emitted from the display is reflected from the optical laminate, a large diffraction angle can be obtained.

In addition, in a case where two or more cholesteric liquid crystal layers having different selective reflection wavelengths are provided, in order to exhibit the effect of obtaining a large diffraction angle at any wavelength, it is necessary that the turning directions of circularly polarized light to be reflected from the cholesteric liquid crystal layers are the same.

Here, although described below in detail, in the first optically-anisotropic layer 12 and the second optically-anisotropic layer 16, the direction in which light is diffracted matches the one in-plane direction in which the direction of the optical axis derived from the liquid crystal compound forming the optically-anisotropic layer continuously rotates. Accordingly, it is preferable that in the first optically-anisotropic layer 12 and the second optically-anisotropic layer 16, the one in-plane direction in which the direction of the optical axis derived from the liquid crystal compound continuously rotates is parallel to a light guide direction of light in the light guide plate 42.

The light guide direction of light in the light guide plate 42 is a direction that connects a position where light is incident into the light guide plate 42 and a position where light is emitted from the light guide plate 42.

In the present invention, although not shown in the drawing, the first optically-anisotropic layer 12, the cholesteric liquid crystal layer 14, and the second optically-anisotropic layer 16 are bonded to each other through a bonding layer provided between the layers. Alternatively, instead of bonding the layers using the bonding layers, the first optically-anisotropic layer 12, the cholesteric liquid crystal layer 14, and the second optically-anisotropic layer 16 may be laminated and held by a frame, a holding device, or the like to configure the optical laminate according to the embodiment of the present invention.

As the bonding layer, any layer formed of one of various well-known materials can be used as long as it is a layer that can bond materials as bonding targets. The bonding layer may be a layer consisting of an adhesive that has fluidity during bonding and is a solid after bonding, a layer consisting of a pressure sensitive adhesive that is a gel-like (rubber-like) flexible solid during bonding and of which the gel state does not change after bonding, or a layer consisting of a material having characteristics of both the adhesive and the pressure sensitive adhesive. Accordingly, the bonding layer may be any well-known layer that is used for bonding a sheet-shaped material in an optical device or an optical laminate, for example, an optical clear adhesive (OCA), an optically transparent double-sided tape, or an ultraviolet curable resin.

In addition, in the example shown in FIG. 1 or the like, in the optical laminate 10, the first optically-anisotropic layer 12, the cholesteric liquid crystal layer 14, and the second optically-anisotropic layer 16 are directly laminated, but the embodiment is not limited thereto. The respective layers may be formed and laminated on each support.

Hereinafter, the respective layers forming the optical laminate according to the embodiment of the present invention will be described.

The first optically-anisotropic layer 12 and the second optically-anisotropic layer 16 have the same configuration, and thus will be collectively referred to as the optically-anisotropic layer.

Figure 4:
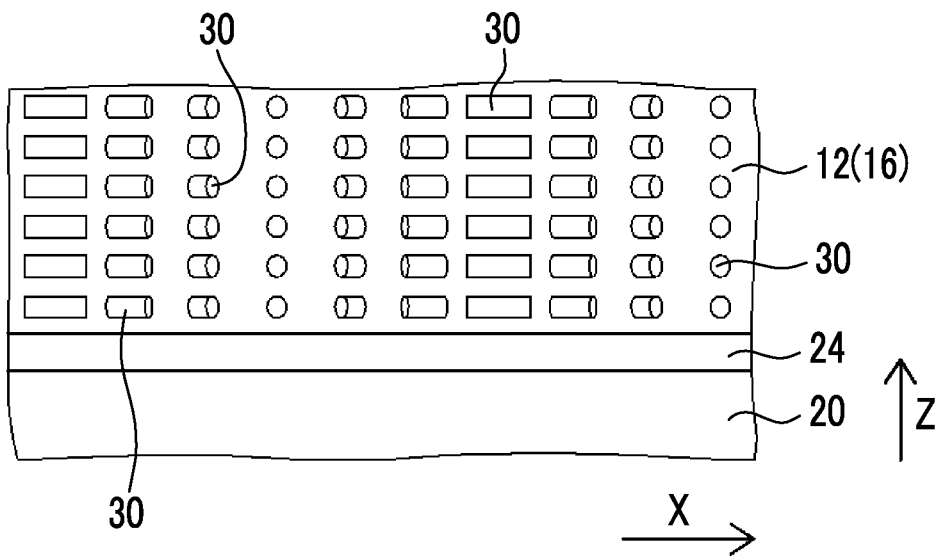
FIG. 4 is a schematic cross-sectional view showing an optically-anisotropic layer.

The optically-anisotropic layer will be described using an optical element in which an optically-anisotropic layer is formed on a support as shown in FIG. 4.

Figure 5:
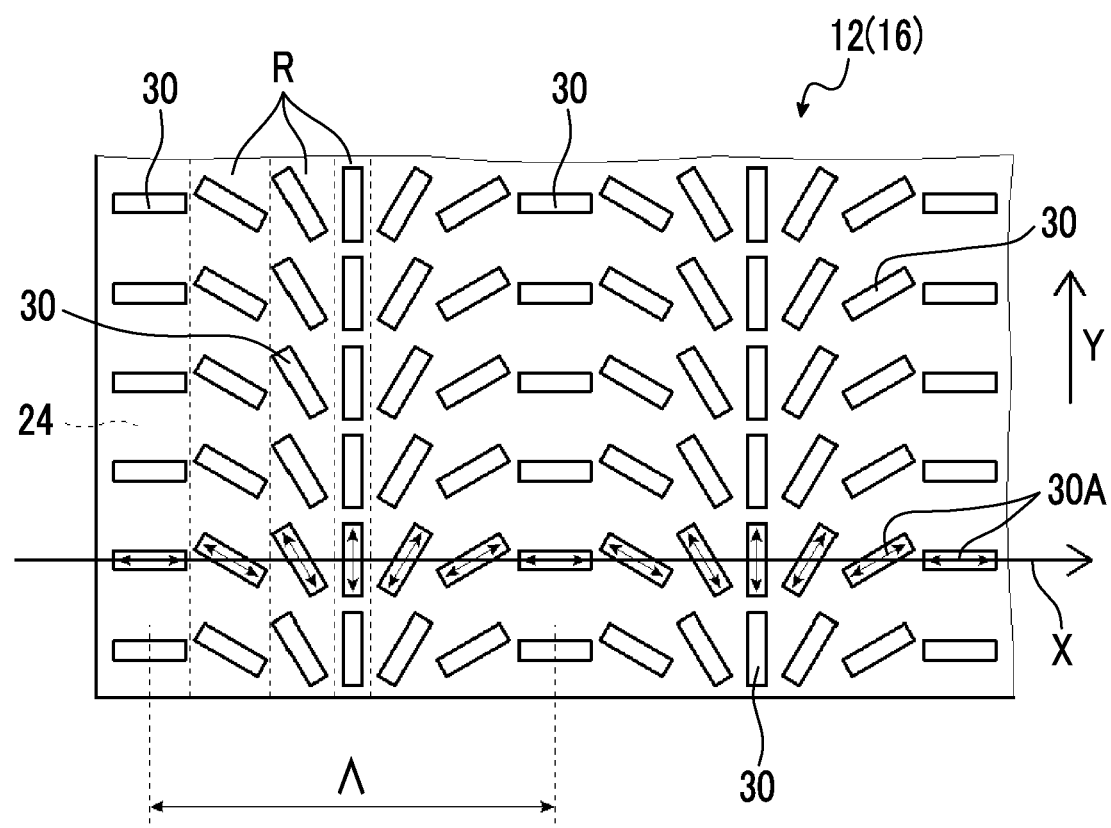
FIG. 5 is a top view showing the optically-anisotropic layer of FIG. 4.

FIG. 4 is a side view conceptually showing an example of the optical element including the optically-anisotropic layer. FIG. 5 is a plan view showing the optical element shown in FIG. 4. The plan view is a view in a case where the optical element is seen from the top in FIG. 4, that is, a view in a case where the optical element is seen from a thickness direction (laminating direction of the respective layers (films)). In other words, the plan view is a view in a case where the optically-anisotropic layer is seen from a direction perpendicular to a main surface.

In addition, in FIG. 5, in order to clarify the configuration of the optical element, only the liquid crystal compound 30 on the surface of the alignment film 24 is shown as the liquid crystal compound 30 in the optically-anisotropic layer. However, in the thickness direction, as shown in FIG. 4, the optically-anisotropic layer has the structure in which the liquid crystal compound 30 is laminated on the liquid crystal compound 30 on the surface of the alignment film 24.

The optical element shown in FIG. 4 includes a support 20, the alignment film 24, and the optically-anisotropic layer 12 (16). The optically-anisotropic layer has a predetermined liquid crystal alignment pattern in which an optical axis derived from the liquid crystal compound continuously rotates in one in-plane direction, the liquid crystal alignment pattern being formed of the composition including the liquid crystal compound.

[Support]

The support 20 is a film-like material (sheet-shaped material or plate-shaped material) that supports the alignment film 24 and the optically-anisotropic layer 12 (16).

A transmittance of the support 20 with respect to light to be reflected from the optical laminate is preferably 50% or higher, more preferably 70% or higher, and still more preferably 85% or higher.

As a material of the support 20, various resins used as a material of a support in an optical element can be used.

Specifically, as the material of the support 20, a support having high transparency is preferable, and examples thereof include a polyacrylic resin such as polymethyl methacrylate, a cellulose resin such as cellulose triacetate, a cycloolefin polymer resin, polyethylene terephthalate (PET), polycarbonate, and polyvinyl chloride. The material of the support 20 is not limited to a resin, and glass may be used.

The thickness of the support 20 is not particularly limited and may be appropriately set depending on the use of the optical element, a material for forming the support 20, and the like in a range where the alignment film and the optically-anisotropic layer can be supported.

The thickness of the support 20 is preferably 1 to 1000 μm, more preferably 3 to 250 μm, and still more preferably 5 to 150 μm.

In the present invention, a configuration in which the optically-anisotropic layer is transferred to another substrate after peeling off the support 20 is also preferably used. That is, by forming the support 20 on the optically-anisotropic layer and peeling the support, as shown in FIG. 1 or the like, a configuration in which the optically-anisotropic layer and the cholesteric liquid crystal layer are laminated directly (through the bonding layer) may be obtained.

[Alignment Film]

The alignment film 24 is formed on the surface of the support 20.

The alignment film 24 is an alignment film for aligning the liquid crystal compound 30 to the predetermined liquid crystal alignment pattern during the formation of the optically-anisotropic layer. In the present invention, the optically-anisotropic layer has a liquid crystal alignment pattern in which a direction of an optical axis 30A (refer to FIG. 5) derived from the liquid crystal compound 30 changes while continuously rotating in one in-plane direction (arrow X direction described below).

In the present invention, in a case where a length over which the direction of the optical axis 30A rotates by 180° in the one in-plane direction in which the direction of the optical axis 30A changes while continuously rotating in the liquid crystal alignment pattern is set as a single period (a rotation period of the optical axis, symbol A in FIG. 5), the optically-anisotropic layer has regions having different lengths of the single periods of the liquid crystal alignment patterns in a plane.

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the present invention, for example, the alignment film can be suitably used as a so-called photo-alignment film obtained by irradiating a photo-alignable material with polarized light or non-polarized light. That is, in the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 6:
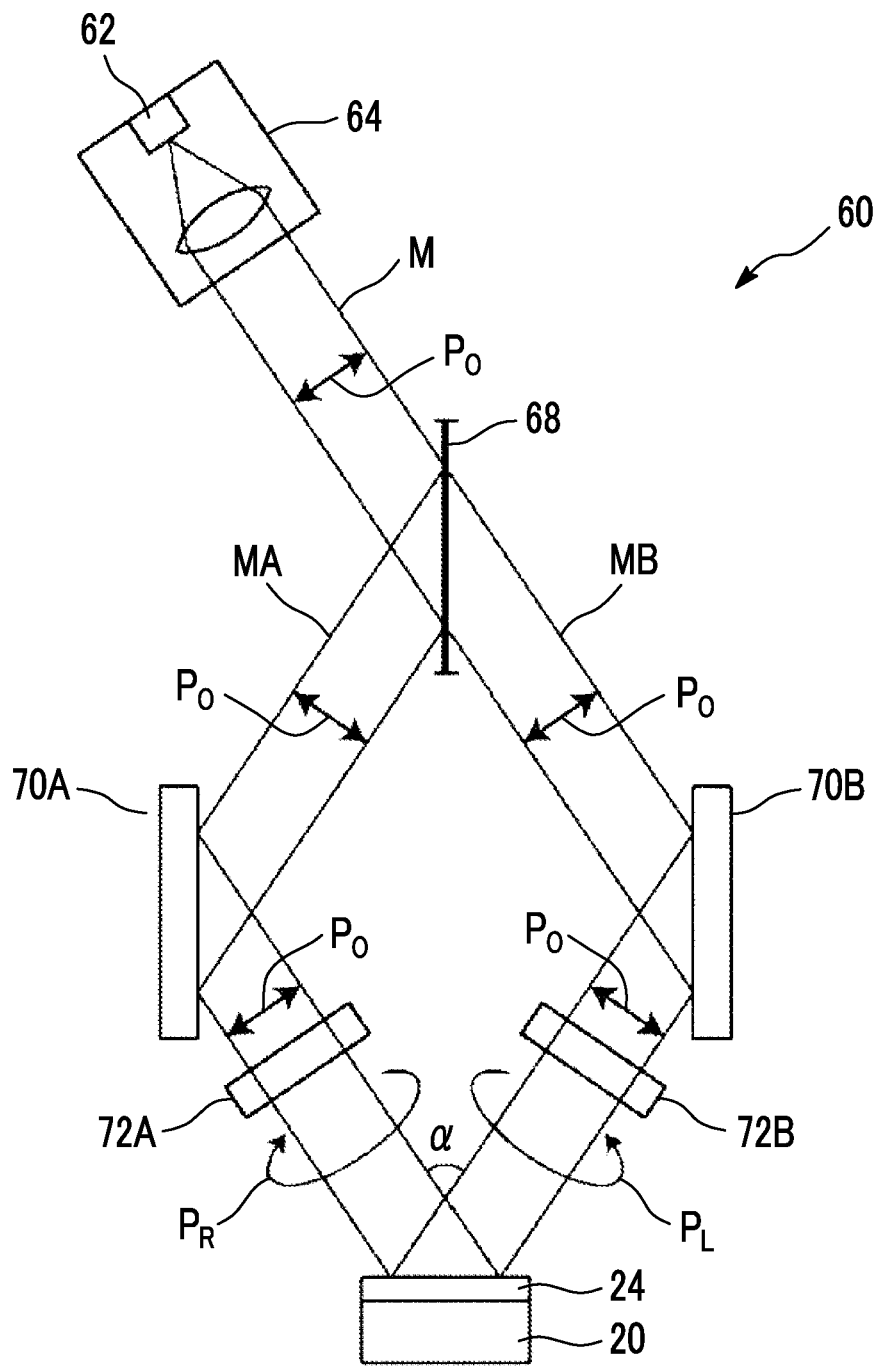
FIG. 6 is a conceptual diagram showing an example of an exposure device that exposes an alignment film.

FIG. 6 conceptually shows an example of an exposure device that exposes the alignment film to form an alignment pattern.

An exposure device 60 shown in FIG. 6 includes: a light source 64 that includes a laser 62; a polarization beam splitter 68 that splits laser light M emitted from the laser 62 into two beams MA and MB; mirrors 70A and 70B that are disposed on optical paths of the splitted two beams MA and MB; and λ/4 plates 72A and 72B.

Although not shown in the drawing, the light source 64 includes a polarizing plate and emits linearly polarized light $P_0$. The λ/4 plates 72A and 72B have optical axes perpendicular to each other. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 20 including the alignment film 24 on which the alignment pattern is not yet formed is disposed at an exposed portion, the two beams MA and MB intersect and interfere with each other on the alignment film 24, and the alignment film 24 is irradiated with and exposed to the interference light.

Due to the interference in this case, the polarization state of light with which the alignment film 24 is irradiated periodically changes according to interference fringes. As a result, in the alignment film 24, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 30A derived from the liquid crystal compound 30 continuously rotates in the one in-plane direction, the length of the single period over which the optical axis 30A rotates by 180° in the one in-plane direction in which the optical axis 30A rotates can be adjusted.

By forming the cholesteric liquid crystal layer on the alignment film having the alignment pattern in which the alignment state periodically changes, as described below, the optically-anisotropic layer having the liquid crystal alignment pattern in which the optical axis 30A derived from the liquid crystal compound 30 continuously rotates in the one in-plane direction can be formed.

In addition, by rotating the optical axes of the λ/4 plates 72A and 72B by 90°, respectively, the rotation direction of the optical axis 30A can be reversed.

In the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the optically-anisotropic layer has the liquid crystal alignment pattern in which the direction of the optical axis 30A derived from the liquid crystal compound 30 changes while continuously rotating in at least one in-plane direction.

[Optically-Anisotropic Layer]

The optically-anisotropic layer 12 (16) is formed on the surface of the alignment film 24.

As described above, in the present invention, the optically-anisotropic layer is formed of the liquid crystal composition including the liquid crystal compound.

In a case where an in-plane retardation value is set as λ/2, the optically-anisotropic layer has a function of a general λ/2 plate, that is, a function of imparting a phase difference of a half wavelength, that is, 180° to two linearly polarized light components in light incident into the optically-anisotropic layer and are perpendicular to each other.

As shown in FIG. 5, The optically-anisotropic layer has the liquid crystal alignment pattern in which the direction of the optical axis 30A derived from the liquid crystal compound 30 changes while continuously rotating in one direction indicated by arrow X in a plane of the optically-anisotropic layer.

The optical axis 30A derived from the liquid crystal compound 30 is an axis having the highest refractive index in the liquid crystal compound 30, that is, a so-called slow axis. For example, in a case where the liquid crystal compound 30 is a rod-shaped liquid crystal compound, the optical axis 30A is along a rod-shaped major axis direction.

In the following description, "in-plane direction indicated by arrow X" will also be simply referred to as "arrow X direction". In addition, in the following description, the optical axis 30A derived from the liquid crystal compound 30 will also be referred to as "the optical axis 30A of the liquid crystal compound 30" or "the optical axis 30A".

Figure 7:
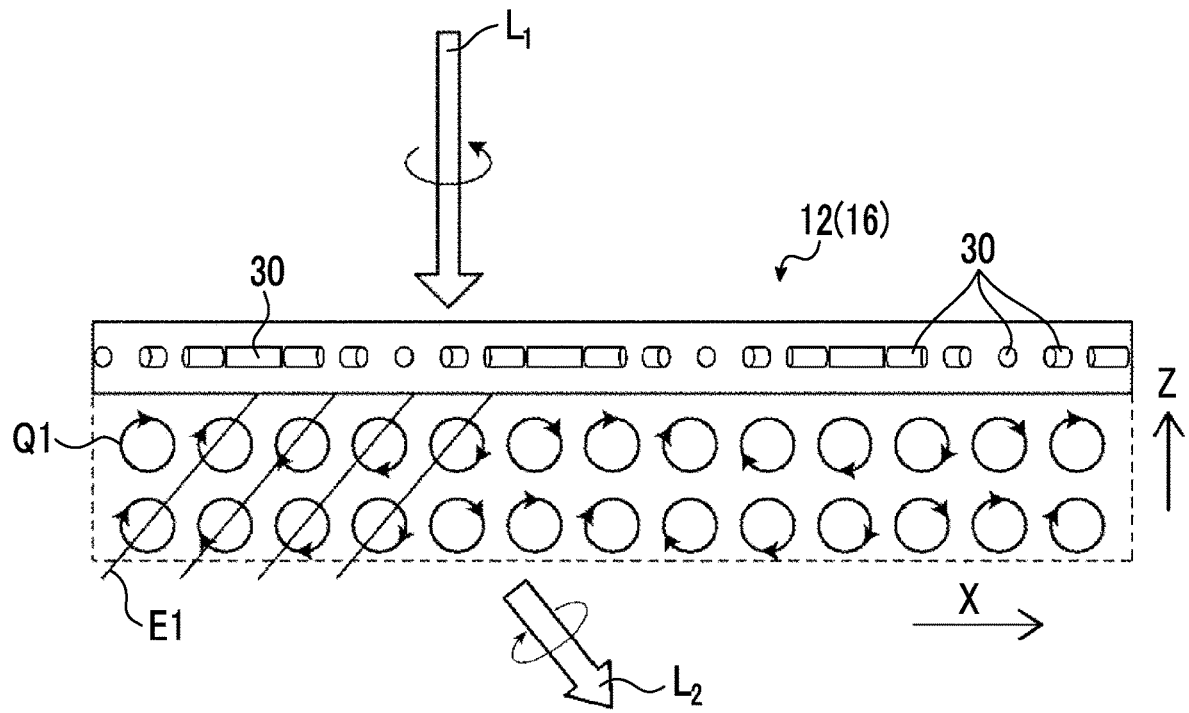
FIG. 7 is a diagram showing an action of the optically-anisotropic layer.
Figure 8:
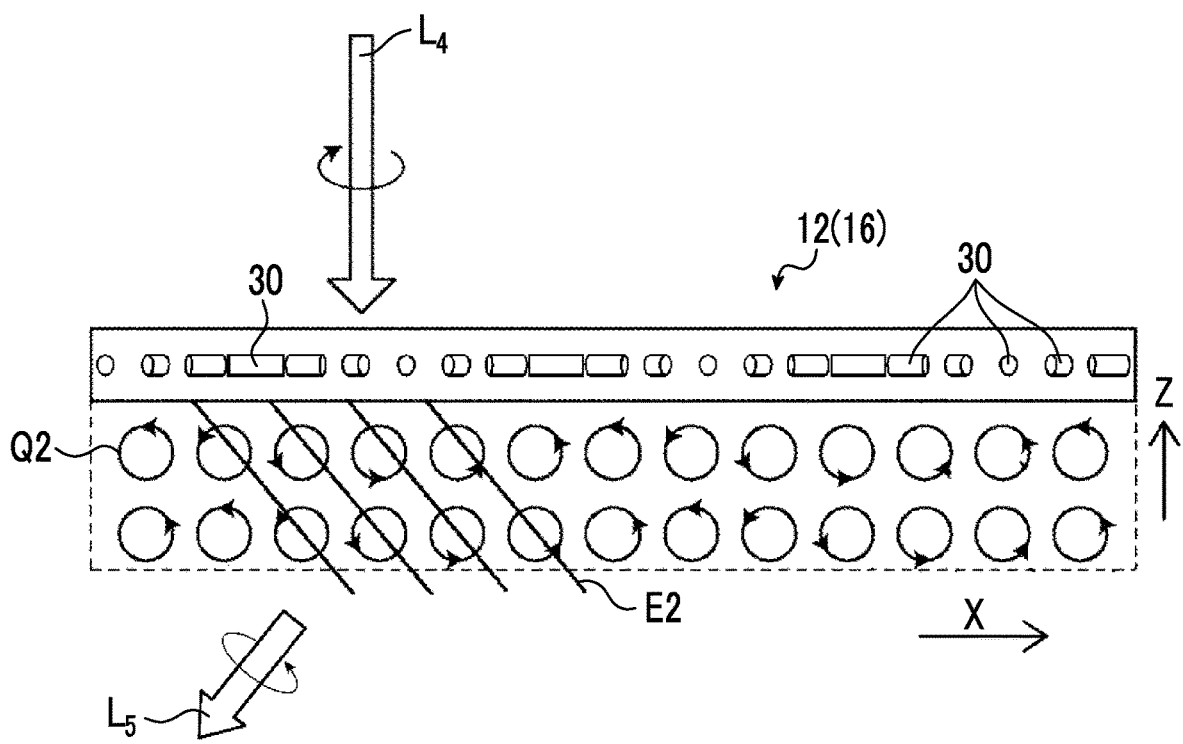
FIG. 8 is a diagram showing the action of the optically-anisotropic layer.

In the optically-anisotropic layer, the liquid crystal compound 30 is two-dimensionally aligned in a plane parallel to the arrow X direction and a Y direction perpendicular to the arrow X direction. In FIG. 4 and FIGS. 7 and 8 described below, the Y direction is a direction perpendicular to the paper plane.

FIG. 5 conceptually shows a plan view of the optically-anisotropic layer.

The optically-anisotropic layer has the liquid crystal alignment pattern in which the direction of the optical axis 30A derived from the liquid crystal compound 30 changes while continuously rotating in the arrow X direction in a plane of the optically-anisotropic layer.

Specifically, "the direction of the optical axis 30A of the liquid crystal compound 30 changes while continuously rotating in the arrow X direction (the predetermined in-plane direction)" represents that an angle between the optical axis 30A of the liquid crystal compound 30, which is disposed in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45θ or less, more preferably 15° or less, and still more preferably less than 15°.

On the other hand, regarding the liquid crystal compound 30 forming the optically-anisotropic layer, the liquid crystal compounds 30 having the same direction of the optical axes 30A are disposed at regular intervals in the Y direction perpendicular to the arrow X direction, that is, the Y direction perpendicular to the one in-plane direction in which the optical axis 30A continuously rotates.

In other words, regarding the liquid crystal compound 30 forming the optically-anisotropic layer, in the liquid crystal compounds 30 disposed in the Y direction, angles between the directions of the optical axes 30A and the arrow X direction are the same.

In the present invention, in the liquid crystal alignment pattern of the liquid crystal compound 30, the length (distance) over which the optical axis 30A of the liquid crystal compound 30 rotates by 180° in the arrow X direction in which the direction of the optical axis 30A changes while continuously rotating in a plane is the length A of the single period in the liquid crystal alignment pattern. In other words, the length of the single period in the liquid crystal alignment pattern is defined as the distance between θ and θ+180° that is a range of the angle between the optical axis 30A of the liquid crystal compound 30 and the arrow X direction.

That is, a distance between centers of two liquid crystal compounds 30 in the arrow X direction is the length A of the single period, the two liquid crystal compounds having the same angle in the arrow X direction. Specifically, as shown in FIG. 5, a distance of centers in the arrow X direction of two liquid crystal compounds 30 in which the arrow X direction and the direction of the optical axis 30A match each other is the length A of the single period. In the following description, the length A of the single period will also be referred to as "single period A".

In the present invention, in the liquid crystal alignment pattern of the optically-anisotropic layer, the single period A is repeated in the arrow X direction, that is, in the one in-plane direction in which the direction of the optical axis 30A changes while continuously rotating.

As described above, in the liquid crystal compounds disposed in the Y direction in the optically-anisotropic layer, the angles between the optical axes 30A and the arrow X direction (the one in-plane direction in which the direction of the optical axis of the liquid crystal compound 30 rotates) are the same. Regions where the liquid crystal compounds 30 in which the angles between the optical axes 30A and the arrow X direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In a case where circularly polarized light is incident into the above-described optically-anisotropic layer, the light is refracted such that the direction of the circularly polarized light is converted.

This action is conceptually shown in FIG. 7 using the optically-anisotropic layer as an example. In the optically-anisotropic layer, the value of the product of the difference in refractive index of the liquid crystal compound and the thickness of the optically-anisotropic layer is λ/2.

As shown in FIG. 7, in a case where the value of the product of the difference in refractive index of the liquid crystal compound and the thickness of the optically-anisotropic layer in the optically-anisotropic layer is λ/2 and incidence light $L_1$ as left circularly polarized light is incident into the optically-anisotropic layer, the incidence light $L_1$ transmits through the optically-anisotropic layer to be imparted with a phase difference of 180°, and the transmitted light $L_2$ is converted into right circularly polarized light.

In addition, in a case where the incidence light $L_1$ transmits through the optically-anisotropic layer, an absolute phase thereof changes depending on the direction of the optical axis 30A of each of the liquid crystal compounds 30. In this case, the direction of the optical axis 30A changes while rotating in the arrow X direction. Therefore, the amount of change in the absolute phase of the incidence light $L_1$ varies depending on the direction of the optical axis 30A. Further, the liquid crystal alignment pattern that is formed in the optically-anisotropic layer is a pattern that is periodic in the arrow X direction. Therefore, as shown in FIG. 7, the incidence light $L_1$ transmitted through the optically-anisotropic layer is imparted with an absolute phase Q1 that is periodic in the arrow X direction corresponding to the direction of each of the optical axes 30A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

On the other hand, as conceptually shown in FIG. 8, in a case where the value of the product of the difference in refractive index of the liquid crystal compound and the thickness of the optically-anisotropic layer in the optically-anisotropic layer is λ/2 and incidence light $L_4$ as right circularly polarized light is incident into the optically-anisotropic layer, the incidence light $L_4$ transmits through the optically-anisotropic layer to be imparted with a phase difference of 180° and is converted into transmitted light $L_5$ of left circularly polarized light.

In addition, in a case where the incidence light $L_4$ transmits through the optically-anisotropic layer, an absolute phase thereof changes depending on the direction of the optical axis 30A of each of the liquid crystal compounds 30. In this case, the direction of the optical axis 30A changes while rotating in the arrow X direction. Therefore, the amount of change in the absolute phase of the incidence light $L_4$ varies depending on the direction of the optical axis 30A. Further, the liquid crystal alignment pattern that is formed in the optically-anisotropic layer is a pattern that is periodic in the arrow X direction. Therefore, as shown in FIG. 8, the incidence light $L_4$ transmitted through the optically-anisotropic layer is imparted with an absolute phase Q2 that is periodic in the arrow X direction corresponding to the direction of each of the optical axes 30A.

Here, the incidence light $L_4$ is right circularly polarized light. Therefore, the absolute phase Q2 that is periodic in the arrow X direction corresponding to the direction of the optical axis 30A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

In the optically-anisotropic layer, it is preferable that the in-plane retardation value of the plurality of regions R is a half wavelength. It is preferable that an in-plane retardation $Re(550) = \Delta n_{550} \times d$ of the plurality of regions R of the optically-anisotropic layer with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the optically-anisotropic layer.

$$200 \text{ nm} \leq \Delta n_{550} \times d \leq 350 \text{ nm} \tag{1}$$

That is, in a case where the in-plane retardation $Re(550) = \Delta n_{550} \times d$ of the plurality of regions R of the optically-anisotropic layer satisfies Expression (1), a sufficient amount of a circularly polarized light component in light incident into the optically-anisotropic layer can be converted into circularly polarized light that travels in a direction tilted in a forward direction or reverse direction with respect to the arrow X direction. It is more preferable that the in-plane retardation $Re(550) = \Delta n_{550} \times d$ satisfies $225 \text{ nm} \leq \Delta n_{550} \times d \leq 340 \text{ nm}$, and it is still more preferable that the in-plane retardation $Re(550) = \Delta n_{550} \times d$ satisfies $250 \text{ nm} \leq \Delta n_{550} \times d \leq 330 \text{ nm}$.

Expression (1) is a range with respect to incidence light having a wavelength of 550 nm. However, an in-plane retardation $Re(\lambda) = \Delta n_\lambda \times d$ of the plurality of regions R of the optically-anisotropic layer with respect to incidence light having a wavelength of λ nm is preferably in a range defined by the following Expression (1-2) and can be appropriately set.

$$0.7\lambda \text{ nm} \leq \Delta n_\lambda \times d \leq 1.3\lambda \text{ nm} \tag{1-2}$$

In addition, the value of the in-plane retardation of the plurality of regions R of the optically-anisotropic layer in a range outside the range of Expression (1) can also be used. Specifically, by satisfying $\Delta n_{550} \times d < 200$ nm or $350 \text{ nm} < \Delta n_{550} \times d$, the light can be classified into light that travels in the same direction as a traveling direction of the incidence light and light that travels in a direction different from a traveling direction of the incidence light. In a case where $\Delta n_{550} \times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation $Re(450) = \Delta n_{450} \times d$ of each of the plurality of regions R of the optically-anisotropic layer with respect to incidence light having a wavelength of 450 nm and an in-plane retardation $Re(550) = \Delta n_{550} \times d$ of each of the plurality of regions R of the optically-anisotropic layer with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450} \times d)/(\Delta n_{550} \times d) < 1.0 \qquad (2)$$

Expression (2) represents that the liquid crystal compound 30 in the optically-anisotropic layer has reverse dispersion properties. That is, by satisfying Expression (2), the optically-anisotropic layer can correspond to incidence light having a wide range of wavelength.

Here, by changing the single period Λ of the liquid crystal alignment pattern formed in the optically-anisotropic layer, refraction angles of the transmitted light components $L_2$ and $L_5$ can be adjusted. Specifically, as the single period Λ of the liquid crystal alignment pattern decreases, light components transmitted through the liquid crystal compounds 30 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and $L_4$ vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 30A of the liquid crystal compound 30 that rotates in the arrow X direction, the refraction direction of transmitted light can be reversed.

The optically-anisotropic layer is formed of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

By forming an alignment film on the support 20, applying the liquid crystal composition to the alignment film, and curing the applied liquid crystal composition, the optically-anisotropic layer consisting of the cured layer of the liquid crystal composition can be obtained. Although the optically-anisotropic layer functions as a so-called λ/2 plate, the present invention also includes an aspect where a laminate including the support 20 and the alignment film that are integrated functions as a so-called λ/2 plate.

In addition, the liquid crystal composition for forming the optically-anisotropic layer includes a rod-shaped liquid crystal compound or a disk-shaped liquid crystal compound and may further include other components such as a leveling agent, an alignment controller, a polymerization initiator, a crosslinking agent, or an alignment assistant. In addition, the liquid crystal composition may include a solvent.

In addition, the optically-anisotropic layer can adopt various configurations of a layer substantially having a function of a λ/2 plate, that is, having a function of converting right circularly polarized light into left circularly polarized light and converting left circularly polarized light into right circularly polarized light. It is preferable that the optically-anisotropic layer has a wide range for the wavelength of incidence light and is formed of a liquid crystal material having a reverse birefringence dispersion. In addition, it is also preferable that the optically-anisotropic layer can be made to have a substantially wide range for the wavelength of incidence light by imparting a twist component to the liquid crystal composition or by laminating different phase difference layers. For example, in the optically-anisotropic layer, a method of realizing an optically-anisotropic layer having a wide-range liquid crystal alignment pattern by laminating two liquid crystal layers having different twisted directions is disclosed in, for example, JP2014-089476A and can be preferably used in the present invention.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-08008LA (JP-H11-08008LA), and JP2001-064627. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

In a case where the disk-shaped liquid crystal compound is used in the optically-anisotropic layer, the liquid crystal compound 30 rises in the thickness direction in the optically-anisotropic layer, and the optical axis 30A derived from the liquid crystal compound is defined as an axis perpendicular to a disk surface, that is so-called, a fast axis.

In the present invention, it is not necessary that the 180° rotation period in the optically-anisotropic layer is uniform over the entire surface. That is, the optically-anisotropic layer may have regions having different lengths of the 180° rotation period in a plane.

In addition, the optically-anisotropic layer may have a portion where the direction of the optical axis is constant as long as a part thereof has the liquid crystal alignment pattern in which the direction of the optical axis rotates in at least one in-plane direction.

In the optical elements shown in FIGS. 4 and 5, the optical axis 30A of the liquid crystal compound 30 in the liquid crystal alignment pattern of the optically-anisotropic layer continuously rotates only in the arrow X direction.

However, the present invention is not limited thereto, and various configurations can be used as long as the optical axis 30A of the liquid crystal compound 30 in the optically-anisotropic layer continuously rotates in the one in-plane direction.

In addition, the optical element may include a plurality of optically-anisotropic layers. By providing a plurality of optically-anisotropic layers, the diffraction efficiency can be improved. In a case where the optical element includes a plurality of optically-anisotropic layers, the single periods Λ of the liquid crystal alignment patterns of the optically-anisotropic layers may be the same as or different from each other. In addition, the liquid crystal alignment patterns may vary depending on the optically-anisotropic layers.

Here, the length of the single period Λ in the alignment pattern of the optically-anisotropic layer is not particularly limited. In a case where the light guide element 44 shown in FIG. 2 is used, from the viewpoint of, for example, diffracting light that is vertically incident into the optically-anisotropic layer at an angle where the light can be totally reflected in the light guide plate 42, the length of the single period Λ is preferably 50 μm or less, more preferably 10 μm or less, and still more preferably 3 μm or less.

In consideration of the accuracy of the liquid crystal alignment pattern and the like, the single period Λ in the liquid crystal alignment pattern of the optically-anisotropic layer is preferably 0.1 μm or more.

In addition, in the present invention, the optically-anisotropic layer does not have a cholesteric structure. That is, the liquid crystal compound is not helically aligned along a thickness direction of the optically-anisotropic layer. As described above, in the optical laminate according to the embodiment of the present invention, in order to obtain a large diffraction angle by diffracting light twice, it is necessary that the optically-anisotropic layer allows transmission of light. Therefore, the optically-anisotropic layer does not have the cholesteric structure that reflects light.

However, in the optically-anisotropic layer, the liquid crystal compound may be loosely twisted and aligned in the thickness direction to the extent that light is not reflected. By loosely twisting and aligning the liquid crystal compound, the diffraction efficiency can be improved.

<<Method of Forming Optically-Anisotropic Layer>>

For example, a method of forming the optically-anisotropic layer includes: a step of applying a liquid crystal composition including the prepared liquid crystal compound to the alignment film; and a step of curing the applied liquid crystal composition.

The liquid crystal composition may be prepared using a well-known method in the related art. In addition, for the application of the liquid crystal composition, various well-known methods used for applying liquid, for example, bar coating, gravure coating, or spray coating can be used. In addition, the coating thickness of the liquid crystal composition (the thickness of the coating film) that is required to obtain an optically-anisotropic layer having a desired thickness may be appropriately set depending on the liquid crystal composition and the like.

Here, the alignment pattern is formed on the alignment film. Therefore, the liquid crystal compound of the liquid crystal composition applied to the alignment film is aligned along the alignment pattern (anisotropic period pattern) of the alignment film.

The liquid crystal composition is optionally dried and/or heated and then cured. The liquid crystal composition may be cured using a well-known method such as photopolymerization or thermal polymerization. For the polymerization, photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

By curing the liquid crystal composition, the liquid crystal compound in the liquid crystal composition is immobilized in a state (liquid crystal alignment pattern) where the liquid crystal compound is aligned along the alignment pattern of the alignment film. As a result, an optically-anisotropic layer having a liquid crystal alignment pattern in which a direction of an optical axis derived from the liquid crystal compound changes while continuously rotating in at least one in-plane direction is formed. The liquid crystal alignment pattern of the optically-anisotropic layer will be described below in detail.

When the optically-anisotropic layer is completed, the liquid crystal compound does not have to exhibit liquid crystallinity. For example, the molecular weight of the polymerizable liquid crystal compound may be increased by a curing reaction such that the liquid crystallinity thereof is lost.

[Cholesteric Liquid Crystal Layer]

Figure 9:
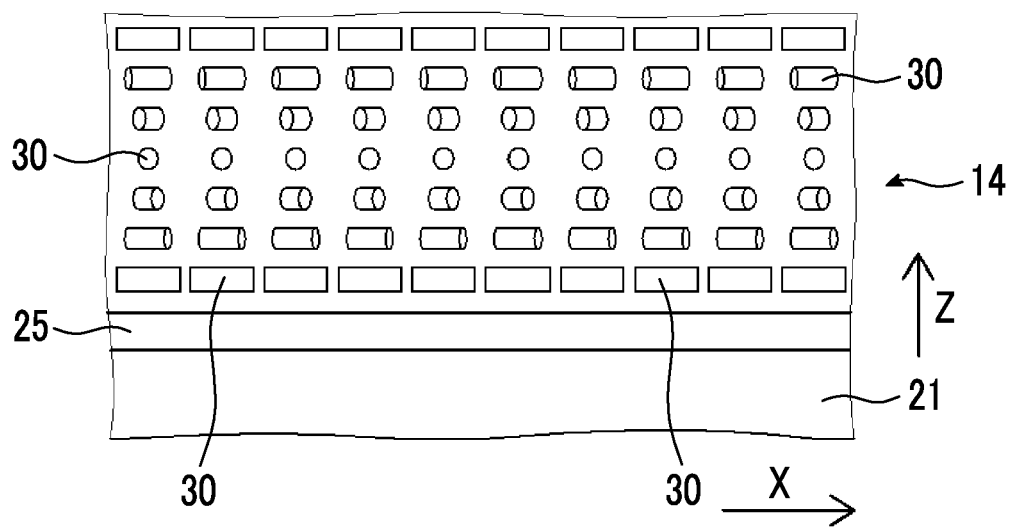
FIG. 9 is a schematic cross-sectional view showing a cholesteric liquid crystal layer.

The cholesteric liquid crystal layer 14 will be described using an optical element in which a cholesteric liquid crystal layer is formed on a support as shown in FIG. 9.

FIG. 9 is a side view conceptually showing an example of the optical element including the cholesteric liquid crystal layer.

The optical element shown in FIG. 9 includes a support 21, an alignment film 25, and a cholesteric liquid crystal layer 14.

As the support 21, the same support as the above-described support 20 can be appropriately used.

In addition, in the present invention, a configuration in which the support 20 is peeled off and the cholesteric liquid crystal layer is transferred may be adopted.

The alignment film 25 is an alignment film for aligning the liquid crystal compound 30 to a predetermined liquid crystal alignment pattern during the formation of the cholesteric liquid crystal layer.

The alignment film 25 is the same as the above-described alignment film 24, except for alignment pattern.

In addition, as the method of forming the alignment film 25, a well-known method forming an alignment film of a cholesteric liquid crystal layer can be appropriately used.

The cholesteric liquid crystal layer 14 is a layer obtained by immobilizing a cholesteric liquid crystalline phase, and has a cholesteric liquid crystal structure in which the liquid crystal compound is helically twisted and aligned along a helical axis parallel to a thickness direction. In the cholesteric liquid crystal layer 14, a configuration in which the liquid crystal compound 30 is helically rotated once (rotated by 360) and laminated is set as one helical pitch, and plural pitches of the helically turned liquid crystal compound 30 are laminated.

This way, the cholesteric liquid crystal layer 14 has wavelength selective reflection properties. For example, in a case where the cholesteric liquid crystal layer 14 reflects right circularly polarized light of red light, the cholesteric liquid crystal layer 14 reflects right circularly polarized light in a red wavelength range and allows transmission of the other light.

<<Cholesteric Liquid Crystalline Phase>>

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the optical element shown in FIG. 9, the cholesteric liquid crystal layer 14 is a layer obtained by immobilizing a left-twisted cholesteric liquid crystalline phase.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection range (circularly polarized light reflection range) where selective reflection is exhibited depends on $\Delta n$ of the cholesteric liquid crystalline phase and the helical pitch P and complies with a relationship of $\Delta\lambda = \Delta n \times P$. Therefore, the width of the selective reflection range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical element and is, for example, 10 to 500 nm and preferably 20 to 300 nm and more preferably 30 to 100 nm.

<<Method of Forming Cholesteric Liquid Crystal Layer>>

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. No. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Further, as the rod-shaped liquid crystal compound, for example, compounds described in JP1999-513019A (JP-H11-513019A) and JP2007-279688A can be preferably used. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer is formed, the cholesteric liquid crystal layer is formed by applying the liquid crystal composition to the alignment film, aligning the liquid crystal compound to a state of a cholesteric liquid crystalline phase, and curing the liquid crystal compound.

An application method is as described above.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

A curing method is as described above.

Here, in the present invention, in the cholesteric liquid crystal layer, the direction of the optical axis derived from the liquid crystal compound is fixed in a plane.

Hereinabove, the optical laminate, the light guide element, and the AR display device according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Optically-Anisotropic Layer>
[Preparation of Support]
(Preparation of Core Layer Cellulose Acylate Dope)

The following composition was put into a mixing tank and were stirred with each other to dissolve the respective components. As a result, a cellulose acetate solution was prepared as a core layer cellulose acylate dope.

Core layer cellulose acylate dope
Cellulose acetate having an acetyl substitution degree of 2.88 100 parts by mass
Polyester A 12 parts by mass
Methylene chloride (first solvent) 430 parts by mass
Methanol (second solvent) 64 parts by mass As the polyester A, a polyester A shown in [Table 1] of JP2015-227956A was used.

(Preparation of Outer Layer Cellulose Acylate Dope)

10 parts by mass of the following matting agent solution was added to 90 parts by mass of the above-described core layer cellulose acylate dope to prepare a cellulose acetate solution as an outer layer cellulose acylate dope.

Matting agent solution
Silica particles having an average particle size of 20 nm (AEROSIL R971, manufactured by Nippon Aerosil Co., Ltd.) 2 parts by mass
Methylene chloride (first solvent) 76 parts by mass
Methanol (second solvent) 11 parts by mass
Core layer cellulose acylate dope 1 part by mass The above-described core layer cellulose acylate dope and the above-described outer layer cellulose acylate dope were filtered through filter paper having an average pore size of 34 µm and a sintered metallic filter having an average pore size of 10 µm, respectively. Next, three layers of the core layer cellulose acylate dope and the outer layer cellulose acylate dope disposed on both sides of the core layer cellulose acylate dope were simultaneously cast on a drum at 20° C. from casting nozzles using a band casting machine.

Next, the obtained film was removed in a state where the solvent content was about 20 mass %, both ends of the film in the width direction were fixed using a tenter clip, and the film was horizontally stretched to a stretching ratio of 1.1% and dried.

Next, by transporting the film between rolls of a heat treatment device and further drying the film, a cellulose support having a thickness of 20 µm was prepared. In the prepared cellulose support, the thickness of the core layer was 15 µm, and the thickness of each of the outer layers disposed on both sides of the core layer was 2.5 µm.

(Saponification Treatment of Support)

The support prepared as described above was caused to pass through a dielectric heating roll at a temperature of 60° C. such that the support surface temperature was increased to 40° C.

Next, an alkali solution shown below was applied to a single surface of the support using a bar coater in an application amount of 14 mL (liter)/m$^2$, the support was heated to 110° C., and the support was transported for 10 seconds under a steam far infraredheater (manufactured by Noritake Co., Ltd.).

Next, 3 mL/m$^2$ of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution
Potassium hydroxide 4.70 parts by mass
Water 15.80 parts by mass
Isopropanol 63.70 parts by mass
SurfactantSF-1: $C_{14}H_{29}O(CH_2CH_2O)_2OH$ 1.0 part by mass
Propylene glycol 14.8 parts by mass (Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

The following modified polyvinyl alcohol 2.40 parts by mass
Isopropyl alcohol 1.60 parts by mass
Methanol 36.00 parts by mass
Water 60.00 parts by mass Modified Polyvinyl Alcohol

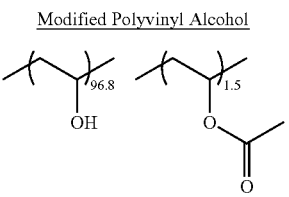

-continued

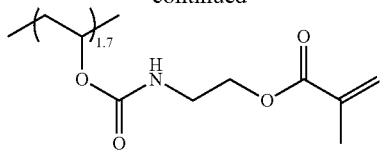

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution
Material A for photo-alignment 1.00 part by mass
Water 16.00 parts by mass
Butoxyethanol 42.00 parts by mass
Propylene glycol monomethyl ether 42.00 parts by mass
—Material A for Photo-Alignment—

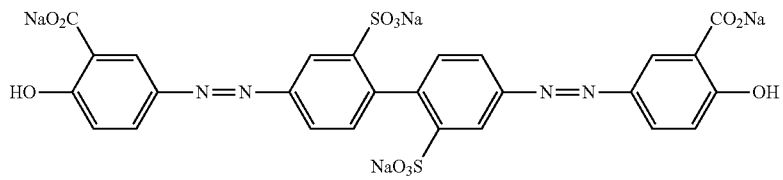

(Exposure of Alignment Film)

The alignment film was exposed using the exposure device shown in FIG. 4 to form an alignment film P-1 having an alignment pattern.

In the exposure device, a laser that emits laser light having a wavelength (325 nm) was used as the laser. The exposure dose of the interference light was 100 mJ/cm². The single period (the length over which the optical axis derived from the liquid crystal compound rotates by 180°) of an alignment pattern formed by interference of two laser beams was controlled by changing an intersecting angle (intersecting angle α) between the two beams.

(Formation of Optically-Anisotropic Layer)

As the liquid crystal composition forming the optically-anisotropic layer, the following composition A-1 was prepared.

Composition A-1
Liquid crystal compound L-1 100.00 parts by mass
Polymerization initiator (IRGACURE (registered trade name) 907, manufactured by BASF SE) 3.00 parts by mass
Photosensitizer (KAYACURE DETX-S, manufactured by Nippon Kayaku Co., Ltd.)
1.00 part by mass
Leveling agent T-1 0.24 parts by mass
Methyl ethyl ketone 1087.80 parts by mass
Liquid Crystal Compound L-1

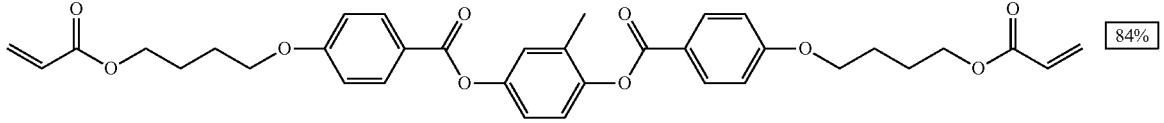

-continued

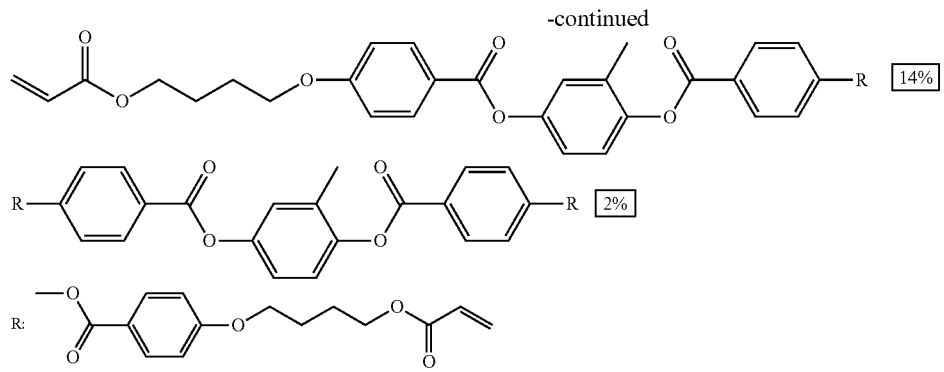

Leveling Agent T-1

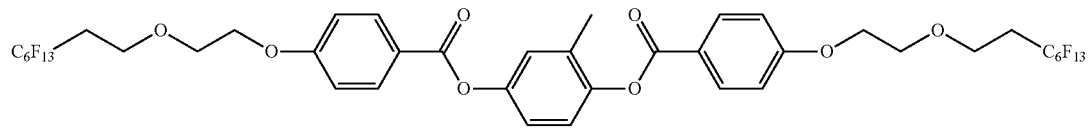

The optically-anisotropic layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition A-1 was applied to the alignment film P-1 to form a coating film, the coating film was heated using a hot plate at 70° C., the coating film was cooled to 25° C., and the coating film was irradiated with ultraviolet light having a wavelength of 365 nm at an irradiation dose of 100 mJ/cm² using a high-pressure mercury lamp in a nitrogen atmosphere. As a result, the alignment of the liquid crystal compound was immobilized. In this case, the thickness of the first liquid crystal layer was 0.2 µm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached 1.62 µm, an optically-anisotropic layer was formed, and a optically-anisotropic member was prepared.

The $\Delta n_\lambda$ of liquid crystal×the thickness (Re(k)) was obtained by applying a composition A-1 to a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value of the liquid crystal immobilized layer. The retardation value at a desired wavelength was appropriately measured using Axoscan (manufactured by Axometrix Inc.).

Finally, in the optically-anisotropic layer, $\Delta n_{550}$×thickness (Re(550)) of the liquid crystals was 275 nm, and it was verified using a polarizing microscope that periodic alignment occurred on the surface as shown in FIG. 5. $\Delta n_{550}$ is 0.17.

In the liquid crystal alignment pattern of the first optically-anisotropic layer, the single period (in the following description, also referred to as "in-plane pitch Λ") over which the optical axis derived from the liquid crystal compound rotated by 180° was 0.97 µm. Hereinafter, unless specified otherwise, "$\Delta n_{550}$×d" and the like were measured as described above.

<Preparation of Forming Cholesteric Liquid Crystal Layer>

(Support and Saponification Treatment of Support)

As the support, a commercially available triacetyl cellulose film (manufactured by Fujifilm Corporation, Z-TAC) was prepared.

The support was caused to pass through a dielectric heating roll at a temperature of 60° C. such that the support surface temperature was increased to 40° C.

Next, an alkali solution shown below was applied to a single surface of the support using a bar coater in an application amount of 14 mL (liter)/m², the support was heated to 110° C., and the support was transported for 10 seconds under a steam far infrared heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution
Potassium hydroxide 4.70 parts by mass
Water 15.80 parts by mass
Isopropanol 63.70 parts by mass
Surfactant
SF-1: $C_{14}H_{29}O(CH_2CH_2O)_2OH$ 1.0 part by mass
Propylene glycol 14.8 parts by mass (Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution
The following modified polyvinyl alcohol 2.40 parts by mass
Isopropyl alcohol 1.60 parts by mass
Methanol 36.00 parts by mass
Water 60.00 parts by mass Modified Polyvinyl Alcohol

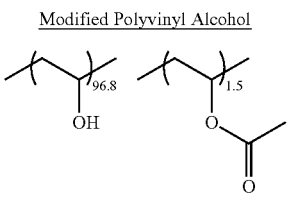

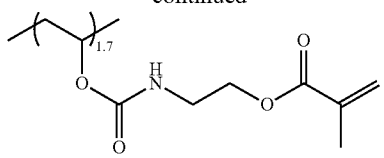

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

The following material for photo-alignment 1.00 part by mass

Water 16.00 parts by mass

Butoxyethanol 42.00 parts by mass

Propylene glycol monomethyl ether 42.00 parts by mass

—Material for Photo-Alignment—

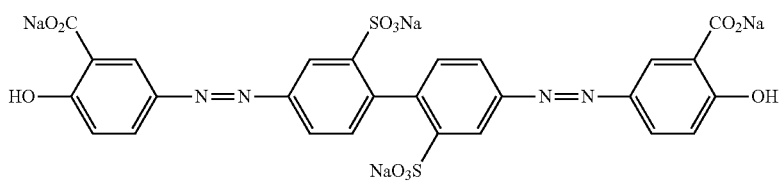

(Formation of Cholesteric Liquid Crystal Layer)

As the liquid crystal composition forming the cholesteric liquid crystal layer, the following composition A-2 was prepared. This composition A-2 is a liquid crystal composition forming a cholesteric liquid crystal layer (cholesteric liquid crystalline phase) that has a selective reflection center wavelength of 550 nm and reflects right circularly polarized light.

Composition A-2
Rod-shaped liquid crystal compound L-1 100.00 parts by mass
Polymerization initiator (IRGACURE (registered trade name) 907, manufactured by BASF SE) 3.00 parts by mass
Photosensitizer (KAYACURE DETX-S, manufactured by Nippon Kayaku Co., Ltd.) 1.00 part by mass
Chiral agent Ch-1 5.68 parts by mass
Leveling agent T-1 0.08 parts by mass
Methyl ethyl ketone 268.20 parts by mass
Rod-Shaped Liquid Crystal Compound L-1

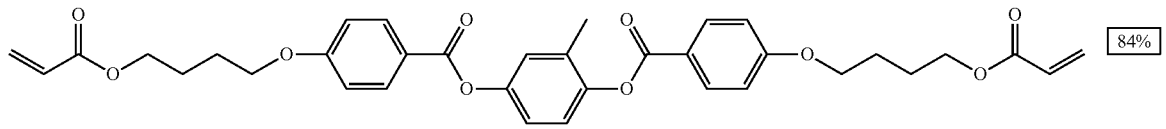

-continued
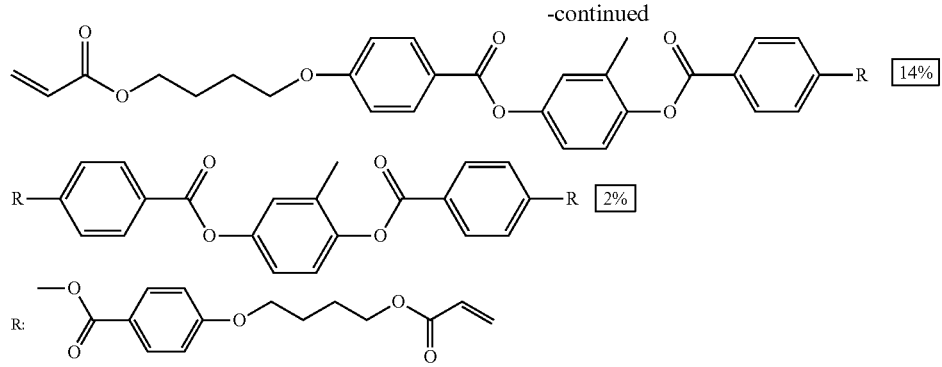
Chiral Agent Ch-1

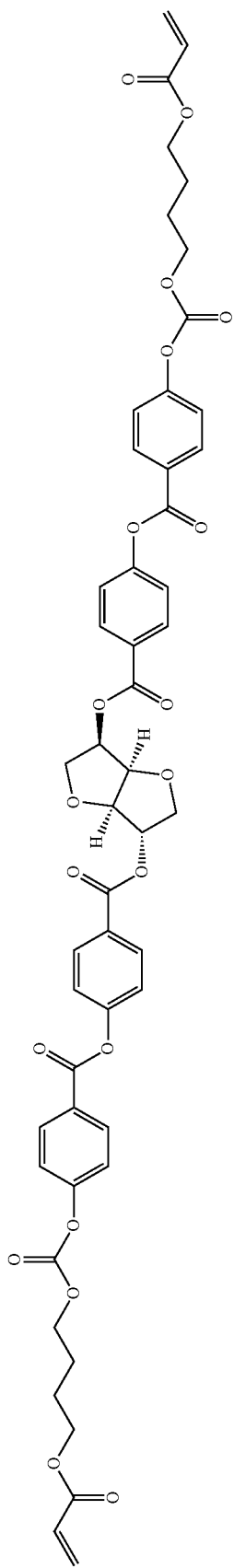

Leveling Agent T-1

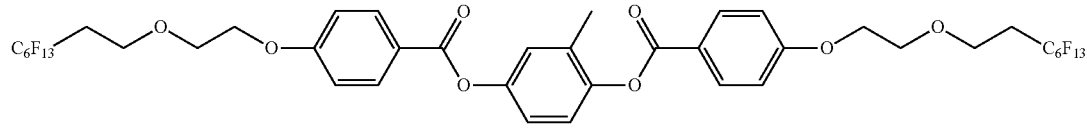

The cholesteric liquid crystal layer was formed by applying multiple layers of the composition A-2 to the alignment film. The application of the multiple layers refers to repetition of the following processes including: preparing a first liquid crystal immobilized layer by applying the first layer-forming composition A-2 to the alignment film, heating the composition A-2, cooling the composition A-2, and irradiating the composition A-2 with ultraviolet light for curing; and preparing a second or subsequent liquid crystal immobilized layer by applying the second or subsequent layer-forming composition A-2 to the formed liquid crystal immobilized layer, heating the composition A-2, cooling the composition A-2, and irradiating the composition A-2 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition A-2 was applied to the alignment film to form a coating film, the coating film was heated using a hot plate at 95° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. In this case, the thickness of the first liquid crystal layer was 0.2 µm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness of 2 µm, and a cholesteric liquid crystal layer was formed.

<Preparation of Optical Laminate>

By using the prepared optically-anisotropic layer as the first optically-anisotropic layer and the second optically-anisotropic layer, the first optically-anisotropic layer, the cholesteric liquid crystal layer, and the second optically-anisotropic layer were bonded in this order using an adhesive (manufactured by Soken Chemical & Engineering Co., Ltd., SK DINE 2057) to prepare an optical laminate. During bonding, the following layer was bonded after peeling the support and the alignment film.

In this case, the first optically-anisotropic layer and the second optically-anisotropic layer were laminated such that the one in-plane directions in which the direction of the optical axes derived from liquid crystal compound continuously rotated were the same. In addition, since the first optically-anisotropic layer and the second optically-anisotropic layer were the same, rotation directions of the direction of the optical axis derived from the liquid crystal compound in the one in-plane direction were the same.

The prepared optical laminate reflected left circularly polarized light and allowed transmission of right circularly polarized light.

Examples 2 and 3

An optical laminate was manufactured using the same method as that of Example 1, except that the alignment pattern during the exposure of the alignment film was changed such that the in-plane pitches A of the first optically-anisotropic layer and the second optically-anisotropic layer were 0.88 µm and 0.76 µm, respectively.

Comparative Examples 1 to 3

Comparative Examples were the same as Examples 1 to 3, except that the second optically-anisotropic layer and the cholesteric liquid crystal layer were not provided. That is, in Comparative Examples 1 to 3, the single optically-anisotropic layer was provided.

Comparative Examples 4 to 6

Optical laminates were prepared using the same methods as those of Examples 1 to 3, except that the second optically-anisotropic layer was not provided. That is, a laminate of the first optically-anisotropic layer and the cholesteric liquid crystal layer was provided.

[Evaluation]

Regarding the prepared optical laminates according to Examples and Comparative Examples, the reflection angle and the transmission angle were evaluated as follows.

[Evaluation of Reflection Angle]

In a case where light was incident from the front (direction with an angle of 0° with respect to the normal line) of the prepared optical laminate on the first optically-anisotropic layer side, angles (reflection angles) of reflected light with respect to the incidence light were measured.

Specifically, each of laser beams having an output center wavelength in a green light range (550 nm) was caused to be vertically incident into the prepared optical laminate from a position at a distance of 100 cm in the normal direction, and reflected light was captured using a screen disposed at a distance of 100 cm to calculate a reflection angle.

[Evaluation of Transmission Angle]

In a case where light was incident from the front (direction with an angle of 0° with respect to the normal line) of the prepared optical laminate on the first optically-anisotropic layer side, angles (transmission angles) of transmitted light with respect to the incidence light were measured.

Specifically, each of laser beams having an output center wavelength in a green light range (550 nm) was caused to be vertically incident into the prepared optical laminate from a position at a distance of 100 cm in the normal direction, and transmitted light was captured using a screen disposed at a distance of 100 cm to calculate a transmission angle.

The results are shown in the following table.

TABLE 1

|  |  |  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Configuration | First Optically-Anisotropic Layer | Δn | 0.17 | 0.17 | 0.17 | 0.17 | 0.17 | 0.17 | 0.17 | 0.17 | 0.17 |
|  |  | Thickness d (μm) | 1.62 | 1.62 | 1.62 | 1.62 | 1.62 | 1.62 | 1.62 | 1.62 | 1.62 |
|  |  | Δnd (nm) | 275 | 275 | 275 | 275 | 275 | 275 | 275 | 275 | 275 |
|  |  | In-Plane Pitch Λ (μm) | 0.97 | 0.88 | 0.76 | 0.97 | 0.88 | 0.76 | 0.97 | 0.88 | 0.76 |
|  | Cholesteric Liquid Crystal Layer | Selective Reflection Wavelength (nm) | 550 | 550 | 550 | — | — | — | 550 | 550 | 550 |
|  | Second Optically-Anisotropic Layer | Δn | 0.17 | 0.17 | 0.17 | — | — | — | — | — | — |
|  |  | Thickness d (μm) | 1.62 | 1.62 | 1.62 | — | — | — | — | — | — |
|  |  | Δnd (nm) | 275 | 275 | 275 | — | — | — | — | — | — |
|  |  | In-Plane Pitch Λ (μm) | 0.97 | 0.88 | 0.76 | — | — | — | — | — | — |
| Evaluation | Reflection Angle (°) |  | 48 | 55 | 70 | — | — | — | 48 | 55 | 70 |
|  | Transmission Angle (°) |  | 0 | 0 | 0 | 35 | 39 | 46 | 35 | 39 | 46 |

As shown in Table 1, it can be seen that, in the optical laminate according to the embodiment of the present invention, although the medium of reflected light is a refractive index medium, a larger reflection angle than the diffraction angle (transmission angle) in a case where the single optically-anisotropic layer is provided can be obtained.

In addition, it can be seen from Comparative Examples 4 to 6 that, in a case where the second optically-anisotropic layer is not provided, transmitted light is diffracted. On the other hand, it can be seen that, in Examples of the present invention, the transmission angle can be set as 0° while increasing the reflection angle.

As can be seen from the above results, the effects of the present invention are obvious.

The present invention is suitably applicable to various uses where light is reflected in an optical device, for example, a diffraction element that causes light to be incident into a light guide plate of AR glasses or emits light to the light guide plate.

EXPLANATION OF REFERENCES

10: optical laminate
12: first optically-anisotropic layer
14: cholesteric liquid crystal layer
16: second optically-anisotropic layer
20, 21: support
24, 25: alignment film
30: liquid crystal compound
30A: optical axis
40: display (image display device)
42: light guide plate
44: light guide element
50: AR display device
60: exposure device
62: laser
64: light source
68: beam splitter
70A, 70B: mirror
72A, 72B: λ/4 plate
M: laser light
MA, MB: beam
$P_O$: linearly polarized light
$P_R$: right circularly polarized light
$P_L$: left circularly polarized light
Q1, Q2, Q: absolute phase
E1, E2, E: equiphase surface
U: user

What is claimed is:

1. An optical laminate comprising, in the following order:
   a first optically-anisotropic layer that is formed of a composition including a liquid crystal compound and has a liquid crystal alignment pattern in which a direction of an optical axis derived from the liquid crystal compound continuously rotates in at least one in-plane direction;
   a cholesteric liquid crystal layer that is obtained by immobilizing a cholesteric liquid crystalline phase; and
   a second optically-anisotropic layer that is formed of a composition including a liquid crystal compound and has a liquid crystal alignment pattern in which a direction of an optical axis derived from the liquid crystal compound continuously rotates in at least one in-plane direction,
   wherein in the first optically-anisotropic layer and the second optically-anisotropic layer, the one in-plane directions in which the direction of the optical axis derived from the liquid crystal compound continuously rotates are the same, and rotation directions of the direction of the optical axis derived from the liquid crystal compound in the one in-plane direction are the same, and
   an in-plane phase difference of the first optically-anisotropic layer and the second optically-anisotropic layer is 190 to 390.

2. The optical laminate according to claim 1,
   wherein in a case where, in the first optically-anisotropic layer and the second optically-anisotropic layer, a length over which the direction of the optical axis derived from the liquid crystal compound rotates by 180° in the one in-plane direction in which the direction of the optical axis derived from the liquid crystal compound changes while continuously rotating is set as a single period, a length of the single period is 0.1 µm to 50 µm.

3. The optical laminate according to claim 2, comprising:
two or more cholesteric liquid crystal layers having different selective reflection wavelengths.

4. The optical laminate according to claim 3, wherein in the two or more cholesteric liquid crystal layers, directions of circularly polarized light to be reflected are the same.

5. A light guide element comprising:
the optical laminate according to claim 2; and
a light guide plate.

6. The light guide element according to claim 5, wherein the optical laminate is disposed at at least either an incidence position or an emission position of light in the light guide plate.

7. The light guide element according to claim 5, wherein in the first optically-anisotropic layer and the second optically-anisotropic layer, the one in-plane direction in which the direction of the optical axis derived from the liquid crystal compound continuously rotates is parallel to a light guide direction of light in the light guide plate.

8. The optical laminate according to claim 1, comprising:
two or more cholesteric liquid crystal layers having different selective reflection wavelengths.

9. The optical laminate according to claim 8, wherein in the two or more cholesteric liquid crystal layers, directions of circularly polarized light to be reflected are the same.

10. A light guide element comprising:
the optical laminate according to claim 1; and
a light guide plate.

11. The light guide element according to claim 10, wherein the optical laminate is disposed at at least either an incidence position or an emission position of light in the light guide plate.

12. An AR display device comprising:
the light guide element according to claim 11; and
an image display device.

13. The light guide element according to claim 10, wherein in the first optically-anisotropic layer and the second optically-anisotropic layer, the one in-plane direction in which the direction of the optical axis derived from the liquid crystal compound continuously rotates is parallel to a light guide direction of light in the light guide plate.

14. An AR display device comprising:
the light guide element according to claim 10; and
an image display device.

* * * * *